(12) United States Patent
Chan et al.

(10) Patent No.: US 7,447,200 B2
(45) Date of Patent: Nov. 4, 2008

(54) SYSTEM AND METHOD FOR SIMULTANEOUSLY TRANSPORTING DIFFERENT TYPES OF INFORMATION OVER A POWER LINE

(75) Inventors: Christina K. Chan, Northridge, CA (US); Kaveh Razazian, Aliso Viejo, CA (US); Farshad Meshkinpour, Los Angeles, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 942 days.

(21) Appl. No.: 10/233,171

(22) Filed: Aug. 30, 2002

(65) Prior Publication Data

US 2003/0088706 A1 May 8, 2003

Related U.S. Application Data

(60) Provisional application No. 60/316,148, filed on Aug. 30, 2001.

(51) Int. Cl.
*H04L 12/56* (2006.01)

(52) U.S. Cl. .......................... 370/389; 370/471; 710/62

(58) Field of Classification Search ................ 370/389, 370/395.61, 419, 445, 465, 466, 469, 470, 370/471, 493, 352; 710/62, 72, 73; 709/250
See application file for complete search history.

(56) References Cited

U.S. PATENT DOCUMENTS

| | | | |
|---|---|---|---|
| 6,577,630 B1 * | 6/2003 | Markwalter et al. ......... 370/392 |
| 6,742,027 B1 * | 5/2004 | Cromer et al. .............. 709/223 |
| 6,891,887 B1 * | 5/2005 | Dobson ..................... 375/220 |
| 6,907,013 B1 * | 6/2005 | Ruziak ...................... 370/277 |
| 6,907,044 B1 * | 6/2005 | Yonge et al. ................ 370/445 |
| 6,934,752 B1 * | 8/2005 | Gubbi ....................... 709/225 |
| 6,987,770 B1 * | 1/2006 | Yonge, III ................... 370/401 |
| 7,054,316 B2 * | 5/2006 | Cheng et al. ................ 370/394 |
| 7,095,754 B2 * | 8/2006 | Benveniste .................. 370/465 |
| 2002/0163933 A1 * | 11/2002 | Benveniste .................. 370/465 |
| 2004/0037311 A1 * | 2/2004 | Willes et al. ................ 370/465 |
| 2004/0037317 A1 * | 2/2004 | Zalitzky et al. .............. 370/466 |
| 2004/0075535 A1 * | 4/2004 | Propp et al. ............ 340/310.01 |
| 2004/0174851 A1 * | 9/2004 | Zalitzky et al. .............. 370/338 |
| 2006/0248208 A1 * | 11/2006 | Walbeck et al. ............. 709/230 |
| 2007/0097960 A1 * | 5/2007 | Kurobe et al. ............... 370/352 |
| 2007/0198748 A1 * | 8/2007 | Ametsitsi et al. ............ 709/249 |
| 2007/0280201 A1 * | 12/2007 | Berkman .................... 370/352 |

\* cited by examiner

*Primary Examiner*—Chi H. Pham
*Assistant Examiner*—Kevin Mew
(74) *Attorney, Agent, or Firm*—Blakely Sokoloff Taylor & Zafman LLP

(57) ABSTRACT

In one embodiment, an adapter is configured for coupling to a power line to receive and propagate multiple types of information including voice and video. In general, the adapter comprises (i) a physical layer adapter including a plug for coupling to the power line and logic to support electrical and mechanical connections to the power line, and (ii) logic to process information contained in HomePlug frames received over the physical layer and to route the processed information to one of a plurality of peripheral devices including a telephone, a monitor and a video recorder.

9 Claims, 6 Drawing Sheets

SYSTEM AND METHOD FOR SIMULTANEOUSLY TRANSPORTING DIFFERENT TYPES OF INFORMATION OVER A POWER LINE

CROSS REFERENCE TO RELATED APPLICATION

This application claims the benefit of priority on U.S. Provisional Application No. 60/316,148, filed Aug. 30, 2001.

FIELD

The invention relates to the field of networks. More specifically, embodiments of the invention relate to a system and method for enabling different types of information, such as audio, video and/or data for example, to be simultaneously transported over a power line between nodes.

GENERAL BACKGROUND

Over the last few years, there has been a growing demand for home networking. In fact, efforts have been made to develop a high-speed home network using the medium of alternating cur-rent (AC) power line wiring. Recently, the HomePlug Powerline Alliance developed a specification that defines the functions, operations and interface characteristics for nodes to communicate over AC power lines. However, this specification, referred to as the "HomePlug 1.0 Specification" dated Jun. 30, 2001, merely addresses the transport of data and does not address the transport of audio (voice) and video possibly simultaneously over these power lines.

BRIEF DESCRIPTION OF THE DRAWINGS

The features and advantages of certain embodiments of the invention will become apparent from the following detailed description of the invention in which.

DETAILED DESCRIPTION

Herein, an exemplary embodiment of the invention relates to a system and method for enabling different types of information to be simultaneously or concurrently transported over power line between nodes. The embodiment described herein is not exclusive; rather, it merely provides a thorough understanding of the invention. Also, well-known circuits and logical interconnections are not set forth in detail in order to avoid unnecessarily obscuring the invention.

In the following description, certain terminology is used to describe features of the invention. For example, a "node" is any equipment that transports information over a power line. Such transport may be in accordance with current or future specifications such as the HomePlug 1.0 Specification published on or around Jun. 30, 2001. Examples of different types of "nodes" include an adapter or a centralized access point (e.g., a gateway or bridge). Each node may be configured to transport multiple types of information simultaneously or concurrently over a power line such as voice and/or data and/or video. A "power line" is generally defined as a medium normally carrying nominal alternating current (AC) voltages. These voltages may range from approximately 120 volts (V) to 240V.

The term "voice" includes audible speech as well as any other type of audio. The term "frame" generally refers to a particular grouping of bits of information for transport. Normally, a frame is formed with a series of packets, which are smaller sized grouping of bits.

Figure 1:
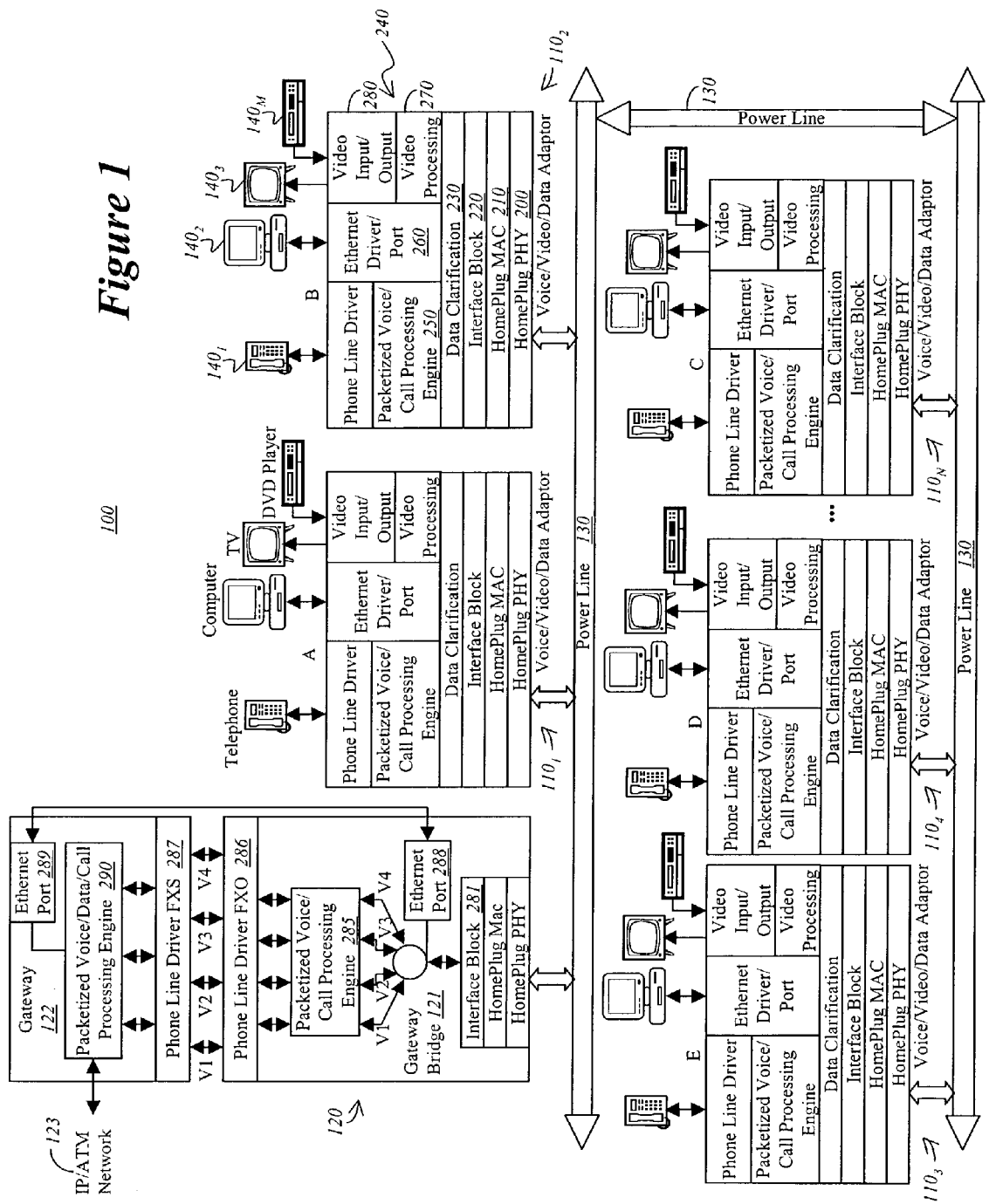
FIG. 1 is an exemplary block diagram of a first embodiment of a network employing the invention.

Referring to FIG. 1, an exemplary block diagram of a first illustrative embodiment of a network 100 employing the invention is shown. The network 100 comprises a plurality of adapters $110_1$-$110_N$ and a centralized access point (CAP) 120 coupled together through a power line 130. As shown, each adapter $110_1, \ldots, 110_N$ may be coupled to one or more (M) peripheral devices 140-$140_M$ such as a telephone $140_1$, a computer $140_2$, a monitor $140_3$ (e.g., cathode ray tube "CRT", television, etc.) or any video recorder inclusive of a digital video disk (DVD) player $140_M$.

An adapter $110_X$ (where $X \geq 1$) includes a two or three-prong plug that can be inserted into an AC wall outlet. This coupled adapter $110_X$ to the power line 130. Although not shown, an adapter $110_X$ may include a processing unit, memory and an input/output (I/O) interface that enables communication with the peripheral devices 140-$140_M$. The I/O interface may be any type of connector (e.g., RJ-11 jack(s), serial, parallel, Universal Serial Bus "USB", etc.) or even a wireless transceiver.

For clarity, a logical representation of each adapter (e.g., adapter $110_1$) is shown in FIG. 1. In particular, for this embodiment, the adapter includes a Physical (PHY) layer 200, a medium access control (MAC) layer 210, an Interface block 220, and a data clarification block 230. In general, the PHY layer 200 includes circuitry and software that supports electrical and mechanical connections to the power line 130. For instance, the PHY layer 200 may support digital-to-analog (D/A) conversion or vice versa, modulation (e.g., Orthogonal Frequency Division Multiplexing "OFDM") and even error correction.

The MAC layer 210 is generally responsible for the segmentation, reassembly and transport of frames (e.g., frames in accordance with the HomePlug 1.0 specification or perhaps subsequent specifications, which are referred to as "Homeplug frames") to higher level layers of the adapter $110_1$. The Interface block 220 is generally responsible for identifying the type of information content contained in an incoming frame received over the powerline 130 and to control the data clarification block 230 to route the incoming frame or information associated with the incoming frame to appropriate processing logic 240. Hence, voice, video and data may be processed at the adapter $110_1$.

More specifically, if information content of the frame is voice or call processing data (e.g., On/Off Hook or other phone control data), a packetized voice/call processing engine 250 processes such information so that the telephone $140_1$ operates as a normal Land line telephone. In the event that the transport information is data, it is routed to a computer $140_2$ as an Ethernet frame produced by Ethernet Driver/Port 260. If the transport information is video, a video processing unit 270 of the adapter $110_1$ processes the incoming video and outputs the video over a video input/output (I/O) 280 to peripheral devices $140_3$-$140_M$.

As shown, the CAP 120 comprises a gateway bridge 121 and an existing gateway 122. The gateway bridge 121 provides a voice/call processing capability and enables communications with the powerline 130 without modification of the existing gateway 122. The gateway bridge 121 interconnects the plurality of adapters 110₁-110ₙ to the gateway 122, which is in communication with a separate network such as a wide area network (WAN) 123 (e.g., Internet) or a local area network (LAN). Herein, only voice data is processed by the gateway bridge 121.

More specifically, with respect to the logical representation of the CAP 120 for this embodiment, the Interface block 281 identifies whether the information contained in the HomePlug frame propagated over the power line 130 comprises voice, data or video by analyzing a packet type field of the HomePlug frame as described below. If the Interface block 281 determines that the information is voice data, such data is routed as analog signals over multiple channel paths (V1-V4) into the gateway 122. A packetized voice/call processing engine 285 configures these signals for routing through a phone line driver foreign exchange office (FXO) 286, a phone line driver foreign exchange station (FXS) 287 and into a second processing engine 290 for packetization of the data and placement on the WAN (or LAN). Meanwhile, if the Interface block 281 determines that the information is data and/or video, such information is recovered from an incoming HomePlug frame and encapsulated into an Ethernet frame transmitted over an Ethernet port 288 of the gateway bridge 121 to an Ethernet port 289 of the gateway 122. Quality of Service (QoS) is performed at the adapter 110ₓ, gateway bridge 121 and gateway 122 to guarantee high quality delivery of voice and video.

Figure 2:
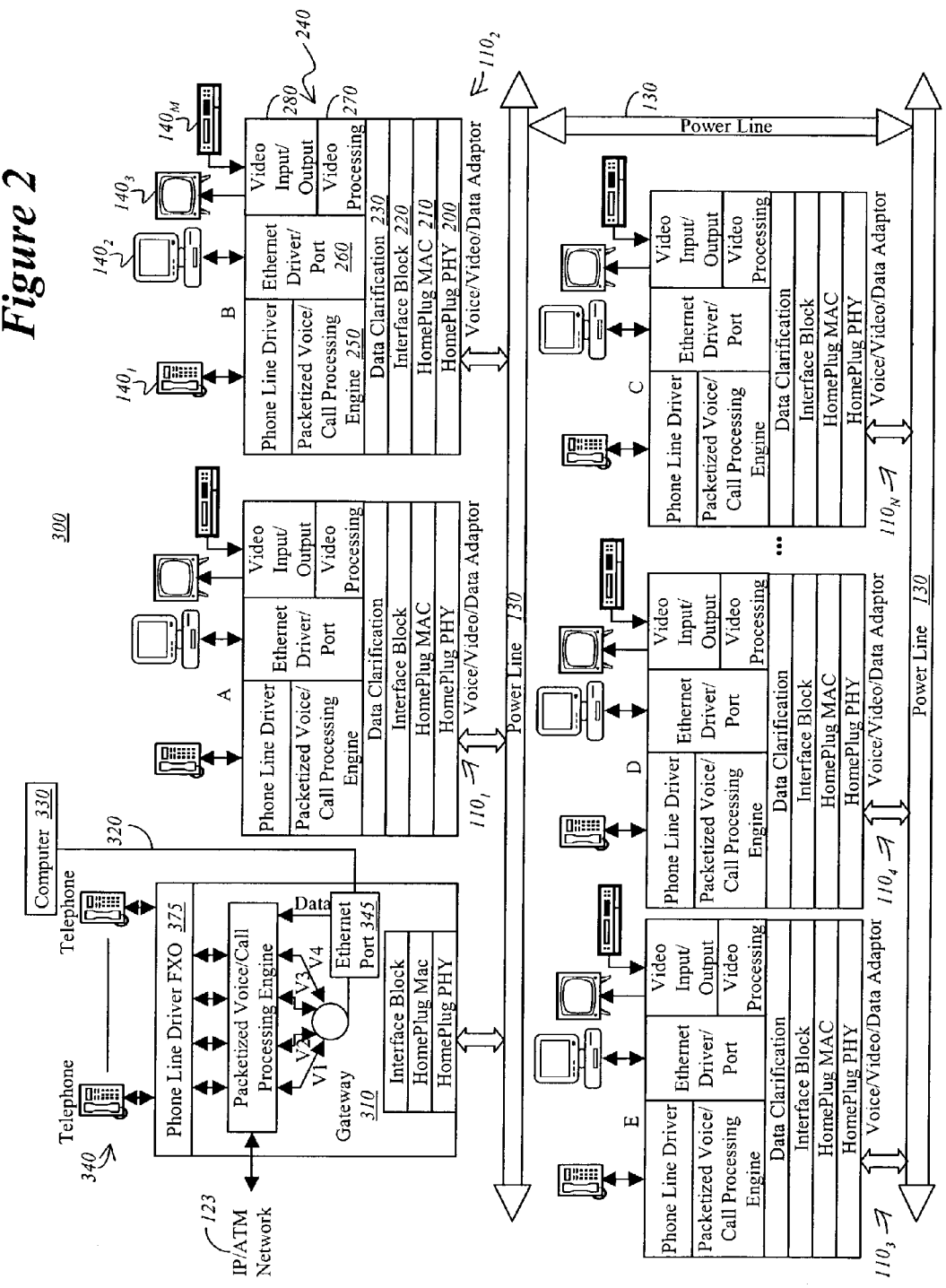
FIG. 2 is an exemplary block diagram of a second embodiment of a network employing the invention.

Referring now to FIG. 2, an illustrative embodiment of an exemplary block diagram of a second illustrative embodiment of a network 300 employing the invention is shown. The network 300 includes the plurality of adapters 110₁-110ₙ coupled to the power line 130 as described above. However, the CAP 310 is a gateway coupled to the power line 130 directly without a gateway bridge as shown in FIG. 1. Only voice and data are processed at the gateway 310. Video data is transported as Ethernet data and no video processing is done at the gateway 310. The gateway 310 is able to route the data accordingly through a link 320 connected to a computer or monitor 330 as shown. A Plain Old Telephone System (POTS) interface (referred to as "Phone Line Driver FX") 335 is present on the gateway 310 to connect to the phones 340 directly. The Ethernet port 345 is present on the gateway 310 to process the data. QoS is performed on the adapters 110₁-110ₙ and gateway 310 to guarantee high quality delivery of video and voice.

For both of these illustrative embodiments of networks incorporating the invention, it is evident that the functional aspects and packetization may be implemented in hardware or software, the later being stored in a processor readable medium. The "processor readable medium" may include any medium that can store or transfer information. Examples of the processor readable medium include an electronic circuit, a semiconductor memory device, a read only memory (ROM), a flash memory, an erasable programmable ROM (EPROM), a fiber optic medium, a radio frequency (RF) link, and any platform readable media such as a floppy diskette, a CD-ROM, an optical disk, a hard disk, etc.

Figure 3:
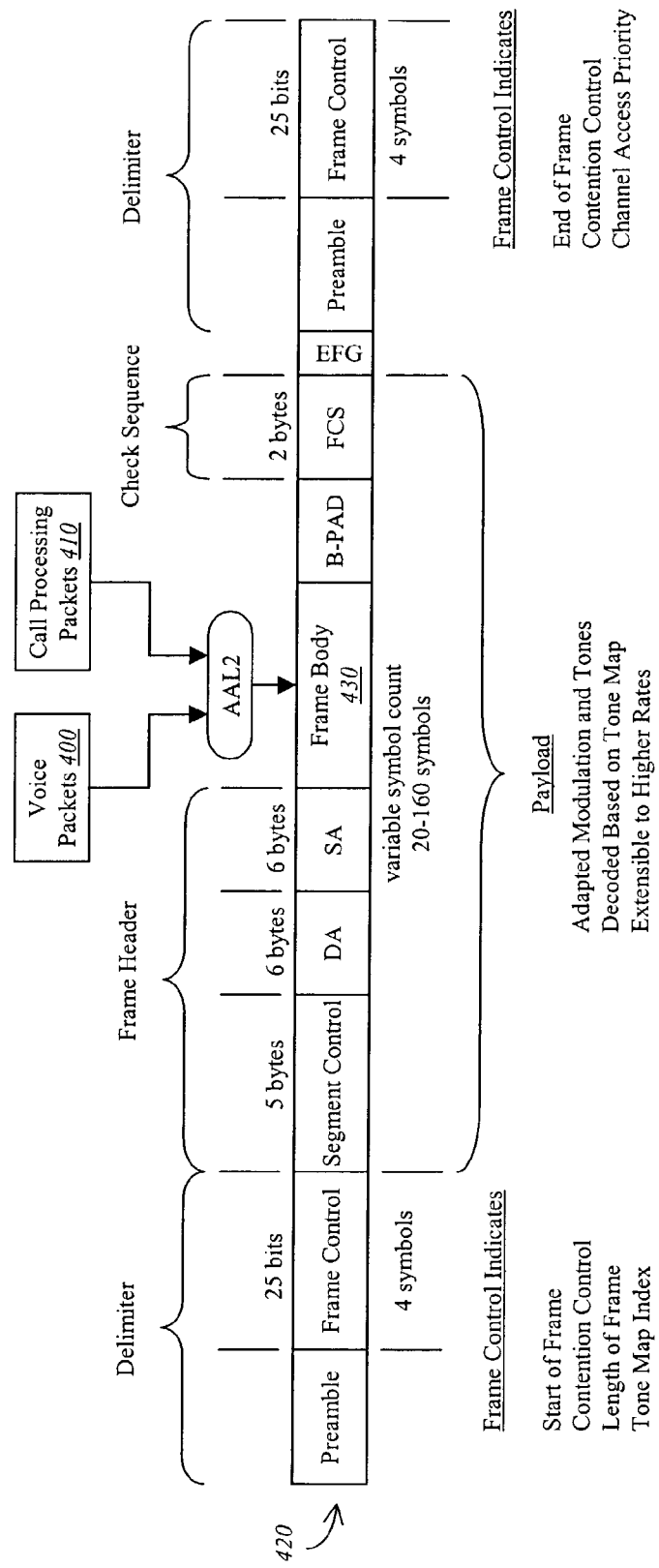
FIGS. 3-5 are exemplary embodiments of various types of information being encapsulated in a data frame such as a HomePlug frame.

Referring now to FIG. 3, an exemplary embodiment of voice and call processing data being encapsulated within the HomePlug frame is shown. For this embodiment, both voice and call processing packets 400 and 410 are normally placed in an AAL2 format for transportation in accordance with an International Telecommunication Union (ITU) recommendation I.366.2 (ITU-T 366.2) entitled "AAL Type 2 Service Specific Convergence Sublayer for Trunking," published February 1999. To be transported over a power line, the ITU-T 366.2 packets 400 or 410 are encapsulated within a frame body 430 of a HomePlug frame 420. The packets 400 or 410 placed within the frame body 430 can be of either an AAL2 Type 1 (unprotected data for voice payload) or AAL2 Type 3 (protected data with triple redundancy for call signaling).

The AAL2 format for voice payload is well defined with small overhead. The packet size can fit into the frame body 430 of the HomePlug frame 420 without the need of segmentation. AAL2 is a single layer protocol; therefore, it would be easy to implement. By using a standardized format, as here, it allows interoperability. In addition, if the payload is already packetized, when the packet to a WAN through the CAP (e.g., gateway) directly based on the same compression algorithm, it does not require a translator to re-packetize. This even simplifies the implementation.

Figure 4:
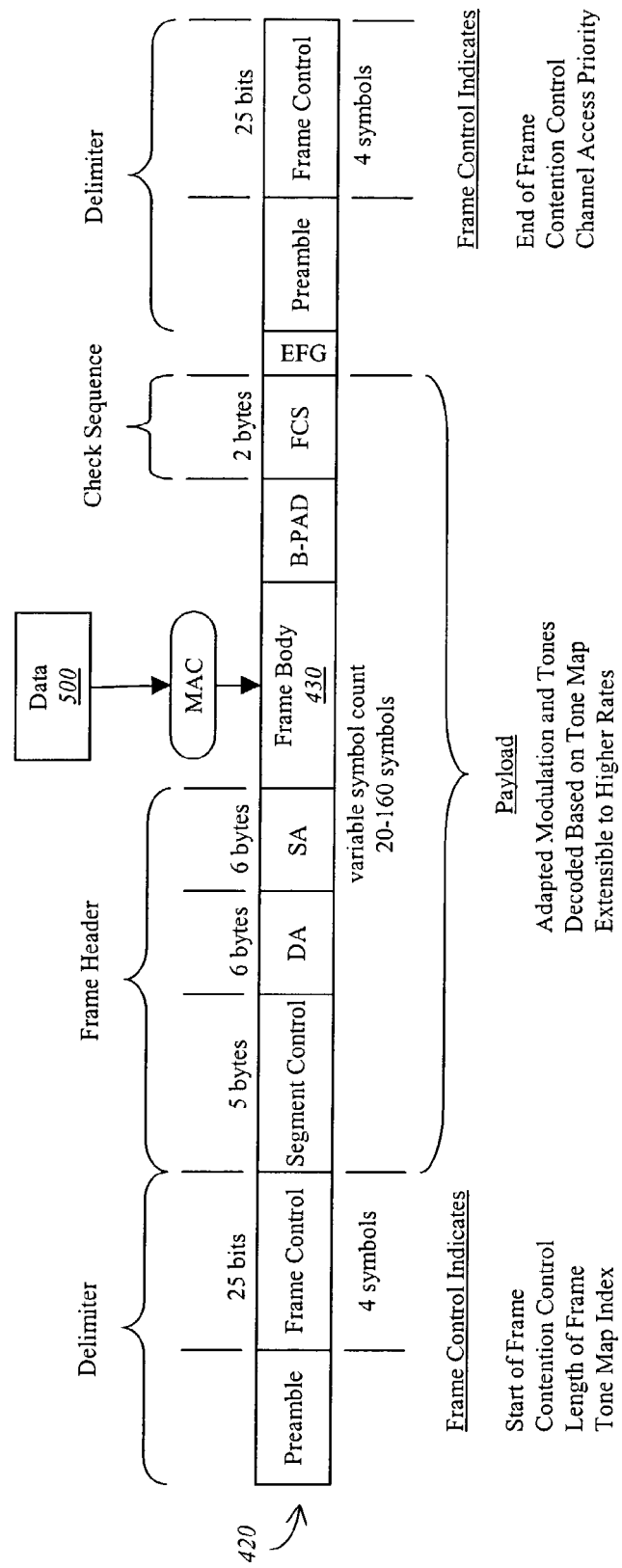

Referring to FIG. 4, an exemplary embodiment of data being encapsulated within the HomePlug frame is shown. Normally, the data 500 is carried in a MAC format in accordance with IEEE 802.3 format. The data 500 is encapsulated within a frame body 430 of the HomePlug frame 420.

Figure 5:
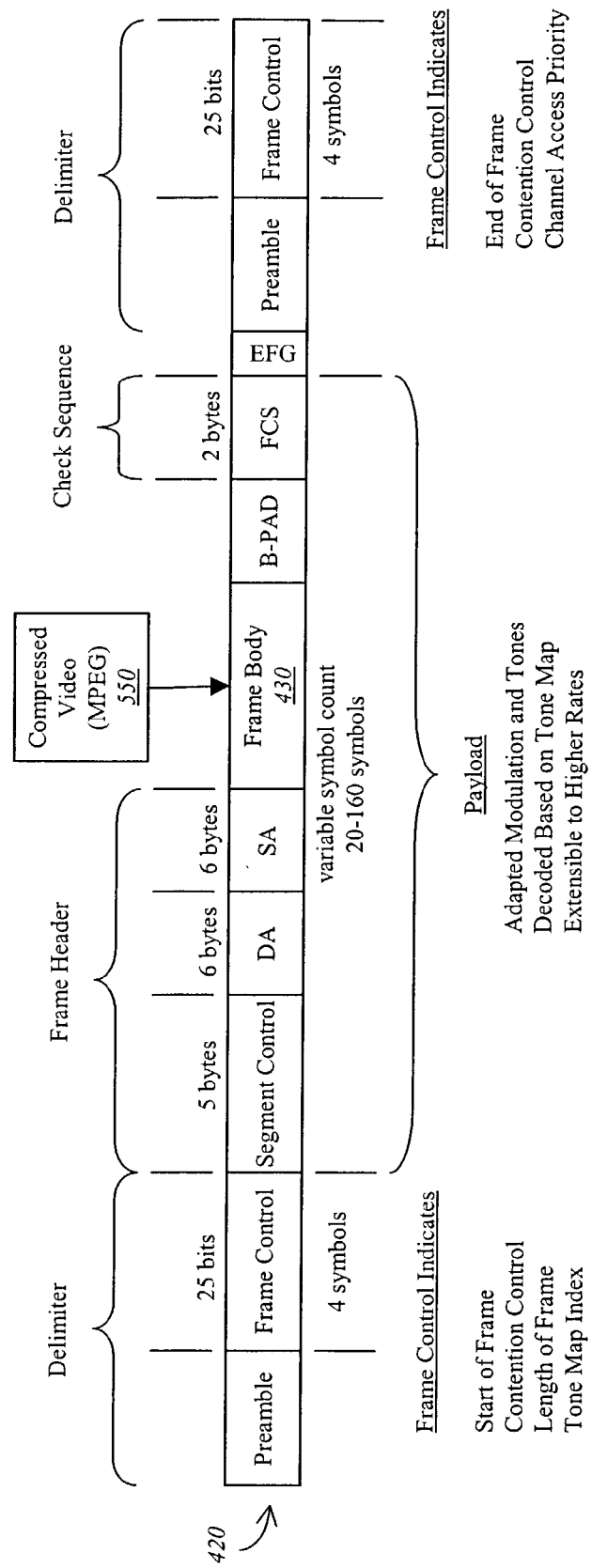

Referring now to FIG. 5, an exemplary embodiment of video being encapsulated within the HomePlug frame is shown. Normally, video 550 is compressed, perhaps in accordance with a MPEG4 format, and the resultant compressed packets 550 are encapsulated within a frame body 430 of the HomePlug frame 420. The video data 550 is processed at the destination node instead of at the CAP. This will save significant bandwidth on the power line.

Figure 6:
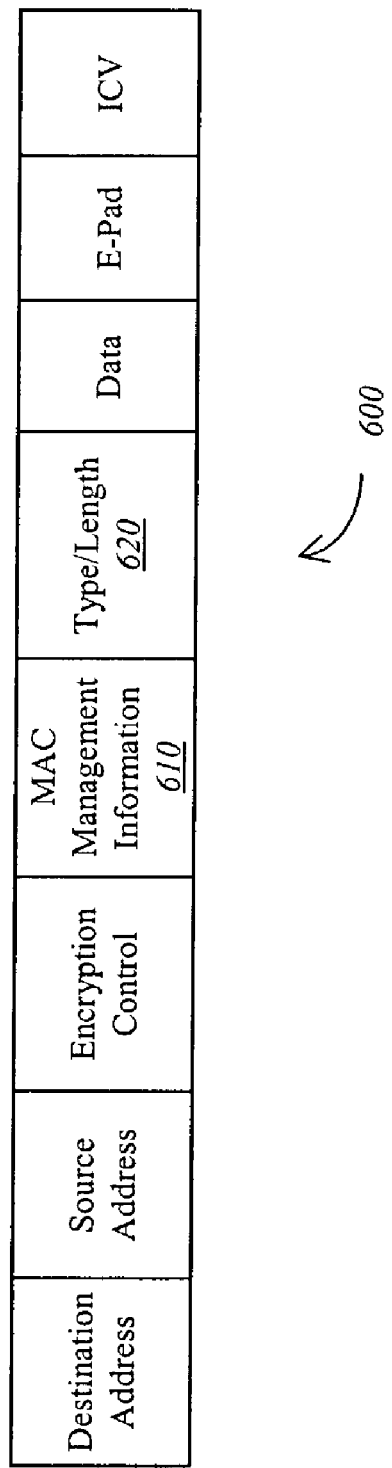
FIG. 6 is an exemplary embodiment of a management information and packet type information being encapsulated in a MAC Data Service Unit (MDSU) for subsequent placement in an outgoing data frame such as a HomePlug frame.

Referring to FIG. 6, an exemplary embodiment of a MAC management information placed within a MAC Service Data Unit (MSDU) .600 is shown. Herein, the MAC management information is stored in the MAC management information field 610 of the MSDU 600, which is normally accomplished during reassembly operations by the MAC layer 210 of FIG. 2. The format of the MAC management information depends on the type of management services provided, including but not limited or restricted to Quality of Service (QoS) and key management.

Referring still to FIG. 6, in order to differentiate different types of packet from each other, the type/length field 620 of the MSDU 600 may be used. The type/length field 620 is used for packet type assignment in order to differentiate type of information being transmitted by the HomePlug frame 420, namely video, voice, data or management. The type/length field 620 is a N-bit field such as 16-bits in length (N=16). Of course, other lengths may be used from 1-bit, 2-bits, 4-bits, 8-bits and the like. This allows for simultaneous or concurrent communications of different types of information such as voice, video and data for instance. By having a packet type for management (e.g., QoS), the quality of the voice and video can be guaranteed. An illustrative table of some of the packet type values placed within the type/length field 620 is shown in Table A. Of course, additional packet types may be supported through assignment of values.

TABLE A

| Type | Ether Type |
| --- | --- |
| Data | 0x0800 |
| Voice | 0xXXXX (Need to register with IEEE) |
| Video | 0xXXXX (Need to register with IEEE) |
| Management | 0x8876 |

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur that fall within the scope of the invention. For example, it may be possible to implement the invention or some of its features in hardware, firmware, software or a combination thereof where the software is provided in a processor readable medium as set forth above.

What is claimed is:

1. A method for transferring information from a power line to one of a plurality of peripheral devices, the method comprising:
    receiving a HomePlug frame by an adapter coupled to the power line, the HomePlug frame including one of a plurality of information types including video, voice and data;
    detecting an information type contained in the HomePlug frame;
    inserting a value indicating the information type into a field of a grouping of bits recovered by the adapter, inserting the value comprising inserting a first value into the field of the grouping of bits to indicate that the information contained in the HomePlug frame is data for routing to a computer coupled to a first assigned port of the adapter; and
    directing the grouping of bits to one of the peripheral devices.

2. The method of claim 1, wherein inserting the value comprises inserting a second value into the field of the grouping of bits to indicate that the information contained in the HomePlug frame is voice for routing to a telephone coupled to a second assigned port of the adapter.

3. The method of claim 2, wherein inserting the value comprises inserting a third value into the field of the grouping of bits to indicate that the information contained in the HomePlug frame is video for routing to one of the peripheral devices coupled to a third assigned port of the adapter.

4. An article of manufacture comprising:
    a machine readable storage medium including data that, when accessed by a machine, cause the machine to perform operations comprising:
        receiving a HomePlug frame by an adapter coupled to the power line, the HomePlug frame including one of a plurality of information types including video, voice and data;
        detecting an information type contained in the HomePlug frame;
        inserting a value indicating the information type into a field of a grouping of bits recovered by the adapter, the value including a first value to indicate that the information contained in the HomePlug frame is data for routing to a computer coupled to a first assigned port of the adapter; and
        directing the grouping of bits to one of a plurality of peripheral devices.

5. The article of manufacture of claim 4, wherein the value includes a second value to indicate that the information contained in the HomePlug frame is voice for routing to a telephone coupled to a second assigned port.

6. The article of manufacture of claim 5, wherein the value includes a third value to indicate that the information contained in the HomePlug frame is video for routing to one of the peripheral devices coupled to a third assigned port of the adapter.

7. An adapter comprising:
    a physical layer coupled to a power line to receive a HomePlug frame, the HomePlug frame including one of a plurality of information types including video, voice and data;
    a medium access control (MAC) layer coupled to the physical layer to insert a value indicating an information type into a field of a grouping of bits contained in the HomePlug frame;
    an interface block coupled to the MAC layer to identify the information type contained in the HomePlug frame using the value, the value including a first value to indicate that the information contained in the HomePlug frame is data; and
    a data clarification circuit coupled to the interface block to route the data to a computer coupled to a first assigned port and to direct the grouping of bits to one of a plurality of peripheral devices.

8. The adapter of claim 7 wherein the value includes a second value to indicate that the information contained in the HomePlug frame is voice for routing to a telephone coupled to a second assigned port.

9. The adapter of claim 7, wherein the value includes a third value to indicate that the information contained in the HomePlug frame is video for routing to one of the peripheral devices coupled to a third assigned port.

* * * * *